US007085321B2

(12) United States Patent
Peset Llopis

(10) Patent No.: US 7,085,321 B2
(45) Date of Patent: Aug. 1, 2006

(54) COMPRESSION

(75) Inventor: Rafael Peset Llopis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 392 days.

(21) Appl. No.: 10/280,649

(22) Filed: Oct. 25, 2002

(65) Prior Publication Data

US 2003/0086493 A1 May 8, 2003

(30) Foreign Application Priority Data

Oct. 29, 2001 (EP) ................................ 01204128

(51) Int. Cl.
*H04N 7/12* (2006.01)

(52) U.S. Cl. ................................................ 375/240.12

(58) Field of Classification Search ........... 375/240.01, 375/240.12, 240.16, 240.26; H04N 7/12
See application file for complete search history.

(56) References Cited

U.S. PATENT DOCUMENTS 6,005,623 A * 12/1999 Takahashi et al. ..... 375/240.16

OTHER PUBLICATIONS

Assuncao et al: Transcoding of MPEG-2 video in the frequency domain Acoustics, Speech, And Signal Proceedings, 1997. ICASSP-97., 1997 IEEE International Conference On Munich, Germany, pp. 2633-2636.

Kleihorst et al: "DCT-Domain Embedded Memory Compression For Hybrid Video Coders" Journal Of VLSI Signal Proceedings Systems For Signal. Image, And Video Technology, Kluwer Academic Publishers, Dordrecht, NL, vol. 24, No. 1, Feb. 2000, pp. 31-40.

* cited by examiner

*Primary Examiner*—Young Lee

(57) ABSTRACT

The invention relates to a method of controlling decoder drift for memory compression comprising the steps of providing a decoded bit-stream output of a decoder (79) and a bit-stream input to an encoder (76) in a first pass of a coding loop, where the bit-stream input to the encoder (76) is based on the decoded bit-stream output of the decoder (79), determining a difference between the bit-stream input to the encoder (76) and the decoded bit-stream output of the decoder (79), where the difference is due to a compression of the decoded bit-stream output of the decoder (79) in the encoder (76) during the first coding loop and correcting the decoded bit-stream output of the decoder (79) in dependence on the determined difference in a second pass of the coding loop.

7 Claims, 1 Drawing Sheet

COMPRESSION

Figure 1:
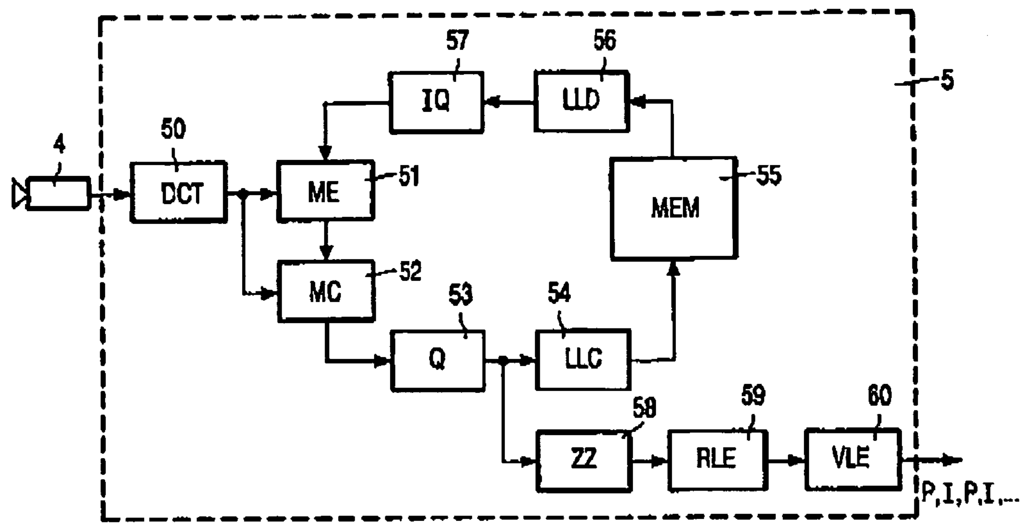

The invention relates to a method and apparatus for controlling decoder drift, especially to a method for controlling decoder drift in embedded memory compression.

There are many occasions when it is necessary to transmit moving picture television via a transmission link. Broadcast quality television requires in excess of 100 Mbit/s when transmitted in digital form which is expensive to transmit and requires links of high bandwidth. An acceptable degree of degradation in the picture quality can be introduced to reduce the information content being transmitted.

Transform coding exploits the correlation of pixel magnitudes within a frame by transforming the magnitudes into another set of values, many of which are relatively small and can therefore be coded using fewer bits. The most common form of transform coding uses the Discrete Cosine Transform (DCT).

Current video compression schemes such as MPEG2 and H.263 need to store a reference image for predictive temporal coding. This image needs almost 5 Mbit of memory for a main-level (720×576 pixels) image format. Traditionally, this image is stored in the spatial domain for straightforward motion estimation and compensation. A disadvantage, noticeable in VLSI implementations, is that the amount of storage in this domain is typically so large that it has to be implemented using external memory ICs. This increases the number of components in a full system, and therefore its price. It becomes feasible to embed the memory with the processing hardware on a single IC if the storage size can be reduced. This reduction can be achieved by storing the image in the compressed domain using the quantization efforts of the parent system followed by a scalable coding technique.

In Kleihorst et al.: "DCT-Domain Embedded Memory Compression for Hybrid Video Coders", Journal of VLSI Signal Processing Systems 24, 31–41 (2000) an encoder structure is proposed that remains in the DCT-domain. An encoded frame in an encoder is decoded and furnished to a frame memory that stores the frame to be used in motion estimation/compensation. In front of the frame memory a scalable coder is present. When the frame memory is full, the scalably coded bit-stream (representing the decoded frame) is truncated, in order to provide the best possible representation of the decoded frame memory given the storage capacity. If the bit-stream furnished to the frame memory is truncated, the frame-representation available in the encoder frame memory will differ form the corresponding frame-representation in the decoder frame memory. Therefore, an error is present, which is not taken into account in the decoder. This results in so-called decoder drift. It has been proposed to use more intra-coded frames, or less compression. However, this results in higher bit-rates.

Embedded compression can also be used in spatial domain encoders.

In WO 95/29561 a transcoder is disclosed. The transcoder for the conversion of video signals between a first and a second coding scheme employing motion compensation comprises a decoder for decoding a received data stream encoded according to a first coding scheme and an encoder for encoding a data stream from the decoder into a data stream according to a second coding scheme. The decoder extracts motion vectors from the received data stream and passes them to the data stream of the encoder, so avoiding the recalculation of the motion vectors. Drift compensation means may be provided to compensate for any resulting drift after a picture frame.

It is an object of the invention to provide an improved method and apparatus for controlling decoder drift for memory compression.

According to an aspect of the invention a method of controlling decoder drift for memory compression is provided. The method comprises the steps of: providing an encoded frame input to an encoder and a decoded frame output of a decoder in a first pass of a coding loop, where said decoded frame output of said decoder is based on said encoded frame input of said encoder; determining a difference between said encoded frame input to said encoder and said decoded output of said decoder, where said difference is due to a compression of an output of said encoder during said first coding loop; and correcting said encoded frame input to said encoder in dependence on said determined difference in a second pass of said coding loop. For embedded memory compression applications, the compression is preferably a truncation. Truncation is an easy to implement and efficient compression. To better guarantee that the truncated bit stream is still decodeable, the encoder should produce a scalable bit stream.

The aforementioned and other aspects of the invention will be apparent from and elucidated with reference to the embodiment described hereinafter.

Figure 2:
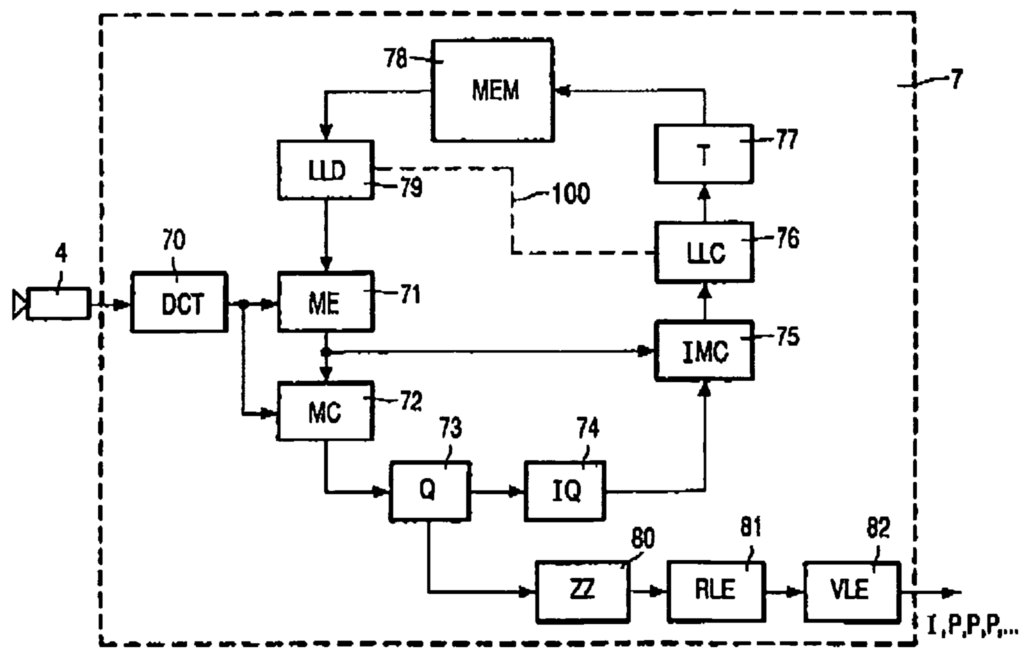

In the drawings:

FIG. 1 shows a hybrid encoder applied in a camera system, where the hybrid encoder uses a scalable coder to furnish a scalable bit-stream to a memory; and FIG. 2 shows a further hybrid encoder applied in a camera system, where the further hybrid encoder uses a scalable coder to furnish a scalable bit-stream to a memory.

Hybrid video compression schemes, such as MPEG2 and H.263 use an image memory for motion-compensated coding. In VLSI implementations, this image is usually stored in external RAM because of its large size. To reduce overall system costs, a compression of the image is proposed by a factor 4 to 5 before storage, which enables embedding of the image memory on the encoder IC itself. In a DCT domain encoder, the input signal is directly subjected to a DCT outside of the encoding loop (see FIGS. 1 and 2). This means that motion estimation and compensation need to be performed in the DCT-domain. The local decoding only goes as far as performing a de-quantization (IQ) and inverse MC (IMC). To take advantage of the large number of zero coefficients after quantization (Q) (still present after IQ), a scalable coder (LLC) is used before storage. A scalable coding method is inherently lossless, but can be quantized from the bit-stream if necessary. Extraction from a memory (MEM) for motion-compensation is performed by a scalable decoder (LLD). Note that almost all of the encoder parts are now situated in the DCT-domain whereas for a traditional, non-DCT domain encoder only a limited part is situated in the DCT-domain. To control and guarantee the actual storage, scalable compression is used.

FIG. 1 shows a camera system comprising a first DCT domain hybrid encoder. The hybrid encoder is in this case a so-called 'PIPI' encoder indicating that it encodes alternating I (intra) an P (inter) frames. The camera system comprises a camera 4 and a hybrid encoder 5. A signal generated by the camera 4 is first DCT transformed in DCT 50. Thereafter, the transformed signal is subjected to motion estimation in ME 51 and to motion compensation in MC 52. The motion compensated signal is quantized in Q 53. The quantized signal is further processed by a zig-zag scanner (ZZ) 58, a run-length encoder (RLE) 59 and a variable length encoder (VLE) 60 to obtain, e.g., an MPEG encoded signal. The quantized signal is further scalable coded in an LLC 54 and thereafter furnished to a memory 55. The required size of the memory 55 can be guaranteed by the buffer/rate control mechanism of the encoder 5 itself. This is because in effect only coefficients of an intra frame I are stored in the memory 55. For applications where encoder cost and edit—ability are more important than compression ratio, such as storage applications, this is suitable encoder. The loop memory 55 is placed just after the quantizer 53 (via the LLC 54), taking almost full advantage of the parent encoder efforts. To obtain a reconstructed frame that can be used in the motion estimator 51, the encoder further comprise a scalable decoder LLD 56 and an inverse quantizer IQ 57, both coupled to the memory 55. The scalable decoder LLD 56 performs an inverse operation of the scalable coder LLC 54.

At higher compression ratios, required for lower bit-rates, successive P frames must be used. An architecture of a camera system comprising a multiple P frame encoder 7 is shown in FIG. 2. Similar to FIG. 1, the encoder 7 comprises a DCT 70, a motion estimator (ME) 71, a motion compensator (MC) 72, a quantization (Q) 73, a ZZ 80, a RLE 81 and a VLE 82. The Q 73 is coupled via a de-quantization (IQ) 74 to an inverse motion compensator (IMC) 75 to obtain a reconstructed signal. In between inter-coded frames P an undefined number of non-zero coefficients con now slip through the IMC mechanism 75 directly to a loop memory 78, bypassing the Q 73. A method to actively control the storage demands is to quantize the signals going into the loop memory 78. Some amount of quantization is permissible as long as the image quality stays (significantly) higher than the targeted output quality of the encoder, and the number of successive P frames is limited. This quantizing is performed by simply stripping a certain percentage of the bitstream for each DCT block, according to the scalable coding principle. A separate buffer control mechanism can profile the image contents and adjust this percentage on the fly. The quantization information is not needed for the decoding phase that is performed in a LLD 79. The additional quantizing is performed by truncator T 77 on a scalable bit-stream produces by an LLC 76. A fall-back mechanism may be employed by switching to intra-blocks if the number of non-zero coefficients is higher than can be accepted. The embodiments shown in FIGS. 1 and 2 produce a standard MPEG or similar encoded bit-stream. This bit-stream can be decoded by a standard decoder.

The encoder 7 shown in FIG. 2 is an example of encoders with embedded memory compression using an additional compression (preferably scalable) in front of the frame memory. An encoded frame in the encoder 7 is decoded and furnished to the frame memory 78 that stores the frame to be used in motion estimation/compensation. In front of the frame memory 78 a scalable coder 76 and a truncator 77 are present. When the frame memory 78 is full, the scalably coded bit-stream (representing the decoded frame) is truncated by means of the truncator 77, in order to provide the best possible representation of the decoded frame memory 78 given the storage capacity.

If the bit-stream furnished to the frame memory 78 is truncated, the frame-representation available in the encoder frame memory will differ form the corresponding frame-representation in the decoder frame memory. Therefore, the truncator 77 introduces an error, which is not taken into account in the decoder LLD 79. This results in so-called decoder drift: the decoded frames contain errors because the motion estimation/compensation in the decoder LLD 79 is based on frames that differ from the frames in the encoder LLC 76.

In order to solve this Problem, during a first pass of the coding loop, the error source is determined, being the difference between the output of the scalable decoder LLD 79 and the input of the scalable encoder LLC 76 (see FIG. 2). It is not necessary to store this frame. Advantageously, a shortcut 100 from the LLC 76 to the LLD 79 may be provided. The determined error is subtracted from the input frame to be encoded. The input frame is coded again (incorporating the error) and the encoded frame is outputted. In this second pass, motion estimation is not necessary. Motion estimation is the most intensive processing in the encoder. Subtracted the error from the input frame can be understood as a first order correction. The decoder now will make comparable errors as those in the encoder such that decoder drift is reduced.

The error determined in the first pass of the coding loop may also be transmitted instead of subtracted from the input.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of controlling decoder drift for memory compression comprising the steps of:

providing an encoded frame input to an encoder and a decoded frame output of a decoder in a first pass of a coding loop, where said decoded frame output is based on a truncation of an output of said encoder;

determining a difference between said encoded frame input to said encoder and said decoded output of said decoder, where said difference is due to the truncation of the output of said encoder during said first coding loop; and correcting said encoded frame input to said encoder in dependence on said determined difference in a second pass of said coding loop.

2. A method as claimed in claim 1, wherein said determined difference is subtracted from said frame input to said encoder in said second pass of said coding loop.

3. A method as claimed in claim 1, wherein said determined difference is transmitted in said second pass of said coding loop.

4. A method as claimed in claim 1, wherein a shortcut 100 is provided between said encoder and said decoder.

5. An apparatus for controlling decoder drift for memory compression comprising:

an encoder and a decoder connected to said encoder; means for:

providing an encoded frame input to said encoder and a decoded frame output of said decoder in a first pass of a coding loop, where said decoded frame output is based on a truncation of an output of said encoder;

determining a difference between said encoded frame input to said encoder and said decoded output of said decoder, where said difference is due to the truncation of the output of said encoder during said first coding loop; and correcting said encoded frame input to said encoder in dependence on said determined difference in a second pass of said coding loop.

6. An apparatus as claimed in claim 5, wherein a shortcut is provided between said encoder and said decoder.

7. A camera system comprising:

an apparatus comprising:

an encoder and a decoder connected to said encoder;

means for providing an encoded frame input to said encoder and a decoded frame output of said decoder in a first pass of a coding loop, where said decoded frame output is based on a truncation of an output of said encoder;

means for determining a difference between said encoded frame input to said encoder and said decoded output of said decoder, where said difference is due to the truncation of the output of said encoder during said first coding loop; and means for correcting said encoded frame input to said encoder in dependence on said determined difference in a second pass of said coding loop.

* * * * *